United States Patent
Aho et al.

(10) Patent No.: US 7,196,700 B1
(45) Date of Patent: Mar. 27, 2007

(54) CONTROLLING DISPLAY

(75) Inventors: Ari Aho, Tampere (FI); Kaj Saarinen, Turku (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/579,626

(22) Filed: May 26, 2000

(30) Foreign Application Priority Data

May 27, 1999 (FI) ..................................... 991206

(51) Int. Cl.
*G09G 5/32* (2006.01)
(52) U.S. Cl. ..................... 345/211; 345/636; 345/667
(58) Field of Classification Search ............... 345/166, 345/167, 713, 211, 214, 204, 206, 636, 667; 455/573, 574, 566; 713/300, 320
See application file for complete search history.

(56) References Cited

U.S. PATENT DOCUMENTS

| | | | |
|---|---|---|---|
| 5,136,695 A * | 8/1992 | Goldshlag et al. ........... | 345/2.1 |
| 5,218,352 A | 6/1993 | Endoh et al. ................ | 340/765 |
| 5,343,557 A * | 8/1994 | Kiel et al. ................... | 345/418 |
| 5,387,922 A | 2/1995 | Yun ............................. | 345/103 |
| 5,394,166 A | 2/1995 | Shimada ...................... | 345/98 |
| 5,450,619 A | 9/1995 | Maeda ......................... | 455/89 |
| 5,659,338 A * | 8/1997 | Nakasuji et al. ............. | 345/536 |
| 5,675,364 A * | 10/1997 | Stedman et al. ............. | 345/211 |
| 5,745,105 A * | 4/1998 | Kim ............................. | 345/212 |
| 5,751,278 A * | 5/1998 | Inamori et al. .............. | 345/211 |
| 5,757,365 A * | 5/1998 | Ho .............................. | 345/212 |
| 5,860,016 A | 1/1999 | Nookala et al. ....... | 395/750.06 |
| 5,867,140 A * | 2/1999 | Rader .......................... | 345/98 |
| 5,970,419 A * | 10/1999 | Terashima et al. .......... | 455/566 |
| 6,121,962 A * | 9/2000 | Hwang ........................ | 345/211 |
| 6,225,992 B1 * | 5/2001 | Hsu et al. .................... | 345/211 |
| 6,407,732 B1 * | 6/2002 | Stiens et al. ................. | 345/204 |
| 6,473,058 B1 * | 10/2002 | Hotomi et al. ............... | 345/1.1 |

(Continued)

FOREIGN PATENT DOCUMENTS

CN         1169643 A        1/1998

(Continued)

OTHER PUBLICATIONS

Patent Abstracts of Japan, Publication No. 10054971.

(Continued)

*Primary Examiner*—Kee M. Tung
*Assistant Examiner*—J. Amini
(74) *Attorney, Agent, or Firm*—Perman & Green, LLP

(57) ABSTRACT

An energy-conserving mobile station and a means for reducing the energy consumption of a mobile station and to reduce burn-in on the display element, where a part of the liquid crystal display element (LCD) of a mobile station is switched off, when the whole display element is not needed and a limited amount of information is displayed on the switched-on part of the display element (A1). An arrangement according to the present invention can be implemented by e.g. driving the control circuit (DC) of the liquid crystal display that supports the partition of the display element to switch of certain rows of the display element in energy conservation mode and switching them on to be used, when information is desired to be displayed on all of the display element.

18 Claims, 2 Drawing Sheets

U.S. PATENT DOCUMENTS

| | | | |
|---|---|---|---|
| 6,675,387 B1* | 1/2004 | Boucher et al. | 725/105 |
| 2001/0052887 A1* | 12/2001 | Tsutsui et al. | 345/87 |
| 2002/0175887 A1* | 11/2002 | Yamazaki | 345/87 |
| 2003/0011586 A1* | 1/2003 | Nakajima | 345/211 |

FOREIGN PATENT DOCUMENTS

| | | |
|---|---|---|
| EP | 0 474 231 | 9/1991 |
| EP | 0474231 B1 | 3/1992 |
| EP | 0840273 A2 | 5/1998 |
| GB | 2320345 | 6/1998 |
| GB | 2320591 | 6/1998 |
| JP | 102114063 | 8/1998 |
| WO | WO 98/00827 | 1/1998 |

OTHER PUBLICATIONS

European Search Report dated Sep. 23, 2003.

* cited by examiner

_US 7,196,700 B1_

CONTROLLING DISPLAY

FIELD OF THE INVENTION

The present invention concerns displays of electronic devices, specifically controlling displays of electronic devices

BACKGROUND OF THE INVENTION

Displays have been incorporated to electronic devices to improve the usability of the devices. For example, presently ordinary mobile stations incorporate a display device, on which the user can monitor the success of keying in a telephone number and by using which he/she can edit the telephone number being keyed in. In tune with the evolution of mobile stations they have been used for communicating by short messages and in future mobile station also by transferring moving images. For these uses it would be preferable for the display of a mobile station to be large so that it would be easy to recognise textual information and/or images. The size of new mobile stations has been perpetually decreasing to improve portability while the evolution of their battery technology and energy maintenance has enabled a stretching of their stand-times even to weeks. With the future mobile station models the need for large amounts of processing required by manipulation of moving images along with an increase in display size and furthermore the transition from passive matrix displays to colour active matrix displays of better quality will significantly increase the power consumption of mobile stations and decrease their standby-time.

The power consumption of the liquid crystal displays now used in mobile stations, as well as that of emission displays being designed, increases relatively to their size. Thus a larger display needed to provide a larger picture area unavoidably consumes more energy and shortens the stand-by time of the mobile station. For this reason in some mobile stations attempts have been made to circumvent this problem by e.g. turning power off from the display. On the other hand, in this case it is impossible to show the user useful information, like strength of field or battery status, by using the display. To circumvent this problem, Panasonic's Pinocchio PHS mobile station in fact carries two displays, a larger display for using e.g. to read and write text, when the mobile station is in use, and a small display to show status information when the mobile station is in standby mode. However, this solution is space-consuming and more expensive and slower to assemble than a single-display solution due to installation of separate components. One other problem caused by displaying the status information is the marks left on the display by years of displaying same data on same place, which marks can interfere with reading the text on the display.

SUMMARY OF THE INVENTION

Now an energy-saving display control method and an electronic device exploiting this method have been invented. The invention is based on the use of new, so-called partitionable or partially powerless coupleable display elements in a device, in which only a part of the display device is active during stand-by mode to present information useful to the user and rest of the display element is switched off to decrease the amount of energy used by the display element.

Here a display element is defined to mean an element dedicated for forming a display, which element can present several non-interdependent pixels, which pixels in turn have a common display surface. The element can be e.g. a liquid crystal display element, which comprises a group of controllable display dots and a transparent cover common to all of these dots, through which cover the dots are visible.

In a method and device according to a first embodiment of the present invention a part of the display element is switched off and only a part of the display element is used to present a certain amount of information. Where a larger display area is needed to present a larger amount of information at one time, a larger part of the display element or the entire display element can be activated.

In a method and device according to a second embodiment of the present invention an initiating row of the display element, beginning at which the use of the display of a certain part is desired, is selected from the display element, and the part of the display element surrounding the selected part is switched off, when the display is used in stand-by mode to present a certain amount of information. Alternatively, a finishing row of the display element can be selected, up to which the use of the display element is desired and the part of the display element surrounding the selected part is switched off, when the display is used in stand-by mode to present a certain amount of information. When a larger display area is needed to present a larger amount of information, a larger part of the display element or the whole display element can be activated.

In a method and electronic device according to a third embodiment of the present invention, an initiating row of the display element used, beginning at which the use of the display of a certain part is desired, is selected from the display element and the part of the display element surrounded the selected part is switched off, when the display is used in stand-by mode to present a certain amount of information. In order to avoid the appearing of permanent marks to the display element, the used part of the display element is changed, so that the same part of the display element is not constantly used to display the same information. The changes in position can be realised e.g. by moving the currently used zone of the display element to a certain direction by certain steps (e.g. up, down, to the side or diagonally), the next position is randomly selected, or the next position is selected in some other way. When a larger display area is needed to present a larger amount of information, a larger part of the display element or the whole display element can be activated.

An electronic device, which comprises a display element to present information, is characterised in that said display element has two modes, a full-screen mode to use the entire display element to display a first information and a partial screen mode to use a first part in which partial screen mode a second part of the display element is switched off; and that the device comprises means for switching the device into energy conservation mode by switching the display element to said partial screen mode; and means for controlling the display element during energy conservation mode to display information on said first part.

A method according to the present invention, for decreasing the energy consumption of an electronic device, is characterised in that a first part of the display element is used and a second part of the display element is switched off to conserve energy; and information is presented on the first part of the display element

BRIEF DESCRIPTION OF THE DRAWINGS

The present invention is explained in detail in the following by referring to the enclosed drawings, in which.

DETAILED DESCRIPTION

Figure 1:
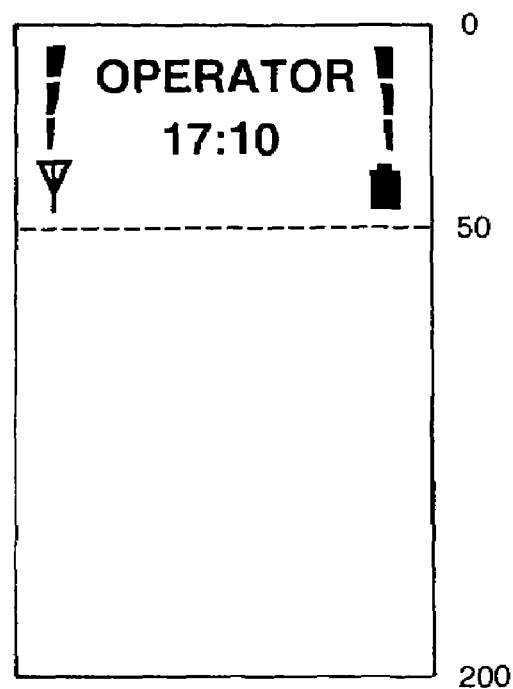
FIG. 1 presents a view on a display of a mobile station according to prior art, when the mobile station is in a stand-by mode.

FIG. 1 presents the display screen of a mobile station according to prior art, when the mobile station is in stand-by mode. The display screen consists of one display element. Only a small part of the display is used, but the whole area of the display is still switched on and consuming energy, even though no information is presented below the used part indicated in the figure with a dotted line. The use of a display element requires processing electronics or display memory in relation to the resolution of the display element and signal processing electronics, the speed of which is in relation to the resolution of the display element, that is a product of the amount of dots and the amount of colour separation bits. The energy save is due to the fact that, among others, a part of the processing electronics can be switched off or the clock frequency can be significantly lowered, as the processed display area significantly decreases. Preferably, though not necessarily, also a part of the display memory can be switched off. Of the rows of the display element row 1 or the upper edge of the display element, row 50 and row 200 or the lower edge of the display element have been marked beside the display screen in the figure.

Figure 2:
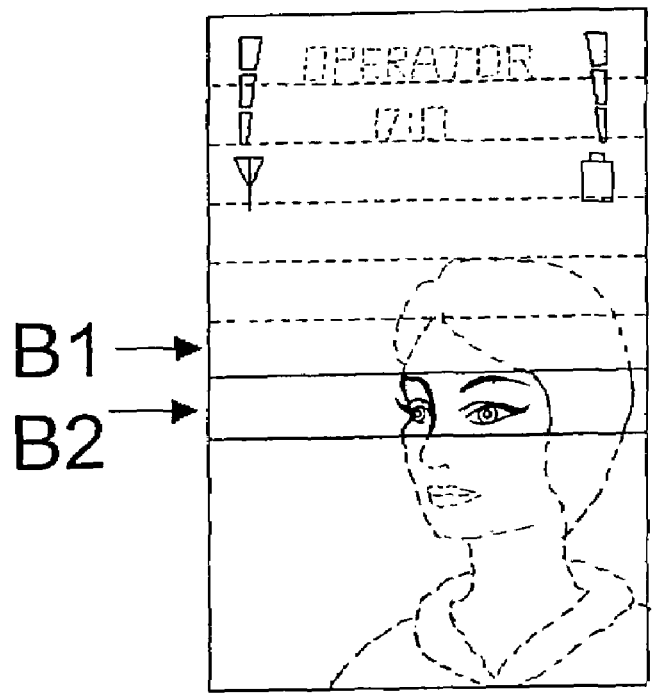
FIG. 2 presents a view on a display of a mobile station according to the present invention, when the mobile station is in a stand-by mode.

FIG. 2 presents a view on the display screen of a mobile station according to the present invention, when the mobile station is in stand-by mode. To improve comprehensibility, the information presented by the earlier presented parts of the display element has also been drawn into the figure. A mobile station according to the present invention saves energy by switching the major part of the display off and by using thin bands of the display element to present a small amount of information, so that the user knows that the mobile station is powered on and in stand-by mode. FIG. 2 presents the used band B2 and the previous band B1.

Figure 3:
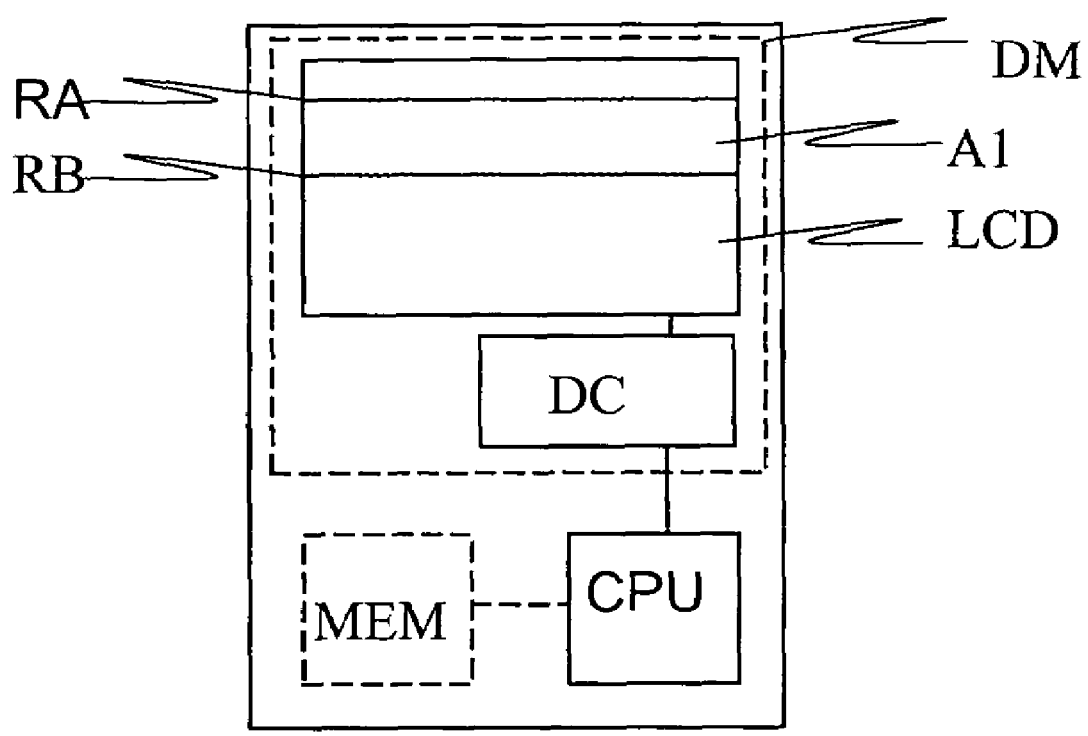
FIG. 3 presents the structure of a display module of a mobile station according to a first embodiment of the present invention and its coupling to other electronics of a mobile station.

FIG. 3 presents the structure of a display module of a mobile station according to a first embodiment of the present invention and the display module's coupling to other electronics of the mobile station. The display module DM comprises a liquid crystal display element LCD, which supports partial screen mode, of which display element a certain part A1 can be switched on to be used. The display module also comprises a display controller DC, which also has a display memory. The display controller controls the liquid crystal display and preferably defines the active area of the liquid crystal display element, e.g. by first row RA to be used and the last row RB to be used. The display controller is in turn coupled to other electronics of the mobile station, such as a central processing unit CPU, which supplies the display controller with the information to be presented on the liquid crystal display element. Alternatively the arrangement can be implemented in such a way that the display memory is replicated into the second memory MEM of the mobile station, to which memory applications can write directly, in which case the central processing unit takes care of updating the display element in a manner controlled by the applications. The area A1 can also be divided to the two edges of the display element, if the display element used and the display controller support it. In this way it is possible to implement the scrolling of a part exceeding one side of the display to the other side of the display element.

A display arrangement according to the present invention can naturally be controlled in several different ways, e.g. by moving the band in leaps by randomly selecting the position of the used band in set intervals or by changing the position in a certain order in certain intervals or alternatively a part of the display element can be switched off first and then the switched-off part can be increased until only the certain area A1 is in use etc. For example, the power consumption of a 200-line liquid crystal display element can in normal mode be 10 mW and in 50-line stand-by mode 6.5 mW. The difference increases stand-by time significantly. The stand-by time of a mobile station according to the present invention, which station uses a passive matrix display, has been estimated to grow with the use of a partial screen mode by some 33%, when 75% of the display area is switched off in stand-by mode. The significance of the invention is accentuated when an active matrix display is used. In that case a corresponding 75% decrease in the used area of the display element corresponds in one case to an increase in calculated stand-by time of over 100%. Such an increase in stand-by time is profitable, because neither the manufacturing cost nor the weight of the mobile station significantly increases from it.

According to an alternative embodiment of the present invention a certain e.g. rectangular part of the display element is used, which part does not need to border to any edge of the display element. In this example both the display controller and display memory are external and are located outside the display. Thus an arrangement according to the present invention can be implemented in a way where an active area is selected by defining a first and last line for it and by selecting a certain part from this band, outside which part only empty space is displayed. In this way at least the amount of display memory needed is decreased, because, compared to the width of the entire display, a smaller part of the display element is used. In this case the necessary information transfer from the memory to the display controller is decreased as is the need for information transfer from display controller on to the display controller. The area formed in this manner can preferably be freely selected from the area of the display element. This possibility can be exploited by moving the used part of the display element (also) in horizontal direction, which makes it possible to avoid display burn-in and create visual effects in an energy-saving way. It is of course possible to move the part also in vertical direction, which means that the embodiment allows movement in two directions, i.e. also diagonally.

A display arrangement according to the present invention can also be developed further among others in such a way that one part of a display element divided to three or more parts are switched off and a second and a third part are switched on on both sides of the switched-off part. In this case e.g. by scrolling the thin band in use on the display element fron the first edge of the display element (e.g. from upper edge or from the side) towards the other edge of the display element and when the band reaches the edge by continuing the part of the band moving "out" of the display element again onto the first edge of the display element. E.g. from a 200-row display element rows 1–7 and rows 189–200 could be in use or active at the same time. Alternatively the display controller of a device according to the present invention can be placed outside the display module itself, e.g. integrate it into the central processing unit of the device or to other electronics, preferably to a microcircuit.

The information displayed in stand-by mode can cover e.g. an indicator of field strength, and indicator of battery status, a keylock symbol, an operator name, time of day, date or other useful information. Displaying the information also indicates to the user that the mobile station is ready for use, but now in stand-by mode.

The invention is suitable e.g. for decreasing the energy consumption of active and passive matrix liquid crystal displays. The invention is not restricted to liquid crystal displays, but is suitable for all such displays (e.g. electroluminance- and fotoluminance-based displays), on which a part of the display element can be switched off and the power consumption of the display is dependent on the amount of image particles on the part switched on. The present invention is suitable for decreasing the energy consumption of all devices comprising such a display element. The present invention is especially well suited for portable battery-driven devices such as electronic games, miniature televisions, video cameras, digital cameras and mobile stations, where the present invention makes possible a stand-by time longer than prior art, as well as to light-emitting devices such as electro-luminance displays of computers. Even though the last mentioned computer displays can be coupled to mains voltage, energy conservation is attempted for environmental reasons.

This has been a presentation of the implementation and embodiments of the present invention through examples. It is obvious to a man skilled in the art that the present invention is not restricted to the details of the embodiments presented above and that the present invention can be implemented in other embodiments without deviating from the characteristics of the present invention. The presented embodiments should be considered illuminatory but not restrictive. The present invention can be implemented e.g. by using the display element in a transversal position with respect to FIG. 2, in which case a part of the columns of the display element can be left in use. Thus the implementantion and use possibilities of the present invention are indeed only restricted by the enclosed patent claims. Therefore the various implementation possibilities of the present invention as well as equivalent implementations belong to the scope of the invention.

The invention claimed is:

1. An electronic device, which comprises a display element to display information, wherein
    said display element has two modes, a full-screen mode to use the entire display element to display a first information and a partial screen mode to use a first part of the display element in which partial screen mode a second part of the display element is switched off; and
    the device comprises:
    means for switching the device into energy conservation mode by switching the display element to said partial screen mode;
    means for controlling the display element during energy conservation mode to display information on said first part; and
    changing means for changing the position of the first part of the display element on the display element at a first set interval and for changing information displayed on the first part of the display element with update information from an application during energy conservation mode.

2. A device according to claim 1, wherein said first part comprises an amount of image particles, and the power consumption of the display element corresponds to the amount of said image particles.

3. A device according to claim 1, wherein the changing means is arranged to change the position of said first part in a certain order in certain intervals.

4. A device according to claim 1, wherein the changing means is arranged to randomly change the position of said first part.

5. A device according to claim 1, wherein the changing means is arranged to change the position of said first part by scrolling the position on the display element.

6. A device according to claim 1, wherein said first part comprises a certain amount of rows.

7. A device according to claim 1, wherein said first part comprises a certain amount of columns.

8. A device according to claim 1, which device comprises means for ending the energy conserving mode in response to one of the following events: user input, incoming call, an increase in displayed information and a combination of these.

9. A device according to claim 1, which device is a mobile station.

10. A device according to claim 1, wherein the changing means is arranged to change information displayed on the first part of the display element.

11. A method for decreasing the energy consumption of an electronic device, wherein
    a first part of the display element is used and a second part of the display element is switched off to conserve energy;
    information is presented on the first part of the display element; and
    the method further includes changing the position of the first part of the display element on the display element at a first set interval and changing information displayed on the first part of the display element with update information from an application during energy conservation mode.

12. A computer readable medium comprising an application for reducing power consumption in an electronic device, including computer program code which when executed by the electronic device causes the electronic device to:
    use a first part of the display element and switch off a second part of the display element to conserve energy;
    change the position of the first part of the display element on the display element at a first set interval and change information displayed on the first part of the display element with update information from a second application during energy conservation mode; and
    present information on the first part of the display element.

13. A display module, which comprises a display element for presenting information and has two states, a full screen mode for using the entire display element to present first information and a partial screen mode for using a first part of the display element, in said partial screen mode a second part of the display element is switched off to conserve energy in said partial screen mode, wherein the display module is further arranged:
    to change the position of the first part of the display element on the display element, to obtain update information, to change information displayed on the first part of the display element with said update information, to set the state of the display module to energy conservation mode by setting the display element to partial screen mode, and to control the display element to present information during the energy conservation mode on the first part of the display element.

14. A display module according to claim 13, wherein said first part of the display element comprises a certain number of image particles and the power consumption of the display element in proportional to the number of the image particles.

15. A display module according to claim 13, wherein the display module is further arranged to change the position of the first part of the display element a certain number of steps in at least one of the horizontal and the vertical direction.

16. A display module according to claim 13, wherein the display module is further arranged to change the position of said first part by scrolling the position on the display element.

17. A display module according to claim 13, wherein the display module is further arranged to switch the module to an energy conservation mode in response to idle time reaching a certain value.

18. A display module according to claim 13, wherein the display module is further arranged to end the energy conserving mode in response to one of the following events: user input, incoming call, an increase in the amount of displayed information at least equal to a certain lower threshold and a combination of these.

* * * * *